United States Patent [19]

Gill et al.

[11] Patent Number: 4,578,253

[45] Date of Patent: Mar. 25, 1986

[54] METHODS OF AND APPARATUS FOR RECOVERING A CONSTITUENT OF A PROCESS EFFLUENT

[75] Inventors: Roger F. Gill, Dunwoody; Pundi L. Narasimham, Norcross, both of Ga.

[73] Assignee: AT&T Technologies, Inc., Berkeley Heights, N.J.

[21] Appl. No.: 575,600

[22] Filed: Jan. 31, 1984

[51] Int. Cl.$^4$ .......................................... C03B 37/075
[52] U.S. Cl. ...................................... 423/87; 55/228; 65/3.12; 210/96.1; 210/196; 210/257.2; 210/805; 210/806; 261/3; 261/5; 261/DIG. 46; 422/62; 422/169; 423/92
[58] Field of Search ............... 210/702, 709, 712, 806, 210/805, 96.1, 196, 195.1, 201, 203, 257.2; 55/228; 261/3, 5, DIG. 46; 422/62, 168, 169; 65/3.12; 423/87, 92

[56] References Cited

U.S. PATENT DOCUMENTS

3,810,544  5/1974  Armstrong et al. ............. 210/195.1
4,217,027  8/1980  MacChesney et al. ............. 65/3.12
4,231,777  11/1980  Lynch et al. .................... 65/3.12
4,385,915  5/1983  Amelse et al. ................... 65/3.12

Primary Examiner—John Doll
Assistant Examiner—Wayne A. Langel
Attorney, Agent, or Firm—E. W. Somers

[57] ABSTRACT

The effluent of a process for making a preform from which an optical fiber is drawn is directed into a scrubber (40) of a loop (20) where it is treated with an aqueous solution to provide a solvent mixture which comprises particulates and a solvent solution including germanium. Subsequently, the solvent mixture is moved into a first filter system (55) which provides a filtrate free of particulates above a first size that is returned to the scrubber for reuse and a residue. Then the residue from the first filter system is moved into a second filter system (80) which provides a filtrate free of particulates larger than a second size that is smaller than the first size and a residue. The filtrate from the second filter system also is returned to the scrubber for reuse while the residue from the second filter system is recirculated therethrough. When the germanium concentration reaches a predetermined level, portions of the residue from the second filter system are withdrawn and subsequently treated with a precipitating agent to recover germanium.

19 Claims, 6 Drawing Figures

METHODS OF AND APPARATUS FOR RECOVERING A CONSTITUENT OF A PROCESS EFFLUENT

TECHNICAL FIELD

This invention relates to methods of and apparatus for recovering a substance from a process effluent. More particularly, it relates to methods of and apparatus for recovering germanium from processes which are used to produce preforms from which lightguide fiber is drawn.

BACKGROUND OF THE INVENTION

The use of optical fiber communication systems has increased significantly during the last few years. It appears likely that the use of this mode of communications will continue to increase in the future. Companies engaged in the manufacture of components for these systems continue to seek ways to reduce the cost thereof.

Presently, optical fibers are being manufactured in processes which include the reaction of a silicon-containing gas and the reaction of a germanium-containing gas to form a deposited glass core having suitable optical properties. These processes are used to fabricate preforms which is the first step in making lightguide fibers. One such process which is known as a modified chemical vapor deposition (MCVD) process is described in J. B. MacChesney, "Materials and Processes for Preform Fabrications-Modified Chemical Vapor Deposition," Vol. 68, Proceedings of IEEE, pp. 1181–1184 (1980).

The input to the MCVD process comprises oxygen as a carrier gas and reactant vapors such as germanium tetrachloride ($GeCl_4$), silicon tetrachloride ($SiCl_4$) and phosphorous oxychloride ($POCl_3$). These reactant vapors are passed through a glass tube which is heated to a temperature in the range of 1600° to 1800° C. by an oxyhydrogen torch. The effluents from the induced germanium and silicon reactions typically include particulates as well as gaseous materials.

This process is relatively inefficient in its incorporation of germanium into the deposited core. Further, in processes such as MCVD which are performed in the substantial absence of hydrogen, such as the hydrogen present in water, germanium in the effluent is not found primarily in the particulates. Instead, the gaseous portion of the effluent contains the major portion of the unreacted germanium. It has been found that about 70% of the germanium tetrachloride does not react and is moved out as a vapor, and 30% of the germanium tetrachloride is converted to germanium dioxide ($GeO_2$) within the substrate tube of which about 50% is deposited. In other words, about 15% of the original amount of the germanium tetrachloride is deposited as particulate matter in the preform whereas about 15% leaves the tube as undeposited particulates. As a result, relatively large quantities of unused germanium, which is the most expensive raw material used in the manufacture of lightguide fibers, are rejected. Moved along with the germanium tetrachloride vapor are solids comprising silicon dioxide ($SiO_2$), $GeO_2$ and phosphorous pentoxide ($P_2O_5$), and chlorine gas. By hydrolysing the germanium in these gases and collecting it in a form suitable for recylcing, a substantial reduction in the cost involved in the manufacture of optical fibers is achieved.

One technique for removing the germanium from the vapor phase, and any germanium in particulate form, involves a process in which a liquid medium is recirculated in a loop. The manufacturing effluent from lathes which are used in the production of optical preforms is scrubbed with an aqueous medium to ensure the hydrolysis of germanium-containing gases such as $GeCl_4$. The aqueous medium is filtered to remove particulates and recycled to treat subsequent process effluent and to be refiltered. The concentration of germanium in the medium is substantially increased by the recycling process and by the dissolution of germanium-containing particulates. Portions of the recirculating medium are periodically or continuously removed and treated to precipitate germanium which is then separated from the remaining liquid by conventional means. See U.S. Pat. No. 4,385,915 which issued on May 31, 1983 in the names of J. A. Amelse et al.

There are problems associated with the recirculating process for recovering germanium. For the economical recovery of germanium, it becomes necessary to maintain a particular concentration level of germanium such as, for example, greater than 600 ppm in the recovered constituent which is in the form of a filter cake. Should the concentration decrease, it becomes more expensive to recover the germanium from the filter cake. Maintaining a particular concentration level becomes a problem because the germanium input to the scrubbers varies as a function of the type and quantity of product manufactured. Each time the recirculating liquid medium is moved through the filter of the above-described process, the germanium concentration is increased. The filter may be controlled to adjust the amount of the recirculating liquid medium which passes through the filter compared to that which is filtered out. As the recirculation rate is increased, the germanium concentration increases, but at the same time the level of particulates in the recirculating liquid increases. As their number increases, the particulates agglomerate which could cause clogging of the filter. Further, a system malfunction, such as pH drop in the recirculating liquid, for example, if left unattended could cause the precipitation of solids in the loop which would cause the filter to clog, resulting in a shutdown of the operation.

Solutions to the foregoing problems have not been provided by the prior art. What is still needed in order to improve the recovery of germanium and thereby reduce costs is a filtration system that is capable of maintaining a required germanium concentration and of controlling the particulates in the recirculating liquid. This must be accomplished notwithstanding the amount of the germanium which is flowed into the loop. Also, the loop should be operable during some non-equilibrium conditions such as during start up of the process.

SUMMARY OF THE INVENTION

The foregoing problems have been overcome by the methods and apparatus of this invention. A method of recovering a constituent of a process effluent such that the constituent has a predetermined concentration includes the step of contacting the effluent with a liquid medium to provide a recirculating mixture which includes the liquid medium and particulates with at least the particulates including the constituent to be recovered. The recirculating mixture is flowed into a first filter which provides a filtrate and a residue. The residue from the first filter is flowed into a second filter which provides a filtrate and a residue which is recirculated through the second filter. Subsequent process effluent is contacted with the filtrates. Portions of the residue from the second filter are withdrawn when the concentration of the constituent is at least the desired value. The filtrates and the subsequent process effluent which is contacted therewith are recirculated through the filters.

More particularly, effluents from a vapor deposition process such as MCVD are flowed to a scrubber of a loop where they are contacted with an aqueous medium to provide a recirculating solvent mixture which comprises a solvent solution and particulates. Germanium tetrachloride in vapor form reacts with the solution and forms part of the recirculating solvent mixture. The recirculating mixture is moved to a first filter system which removes particulates larger than a first size and which provides a filtrate in which the particulates generally are no larger than that size. The filtrate is moved from the first filter system to the scrubber for reuse while another portion of the recirculating mixture which is not passed by the filter and which is referred to as a residue is moved to a second filter system. In the second filter system, the residue from the first filter system flows into tubes and a filtrate flows outwardly through membrane walls of the tubes. The second filter system is effective to remove from its filtrate particulates larger than a second size that is smaller than the first size and to provide a residue. The filtrates from the first and second filter systems which are returned to the scrubber are substantially clear and include reaction products of germanium in solution. The residue from the second filter system is moved to a holding tank and recirculated through the second filter system. On occasion, portions of the residue from the second filter system are withdrawn into a tank which stores a germanium solution of the same concentration as that in the loop. The withdrawn germanium is precipitated out of solution in accordance with the methods disclosed in the above-identified U.S. Pat. No. 4,385,915 which is incorporated by reference hereinto.

The use of cooperating filter systems allows the germanium concentration to be controlled while the level of particulates is controlled to prevent clogging of the apparatus. A predetermined concentration of a dissolved substance is maintained in a recirculating liquid medium. This is accomplished while particulates are maintained at a minimum, regardless of most operating conditions. Further, the methods and apparatus of this invention are applicable to the recovery of substances other than germanium whenever a mixture comprising a liquid medium and particulates is provided for recirculation.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

Figure 1:
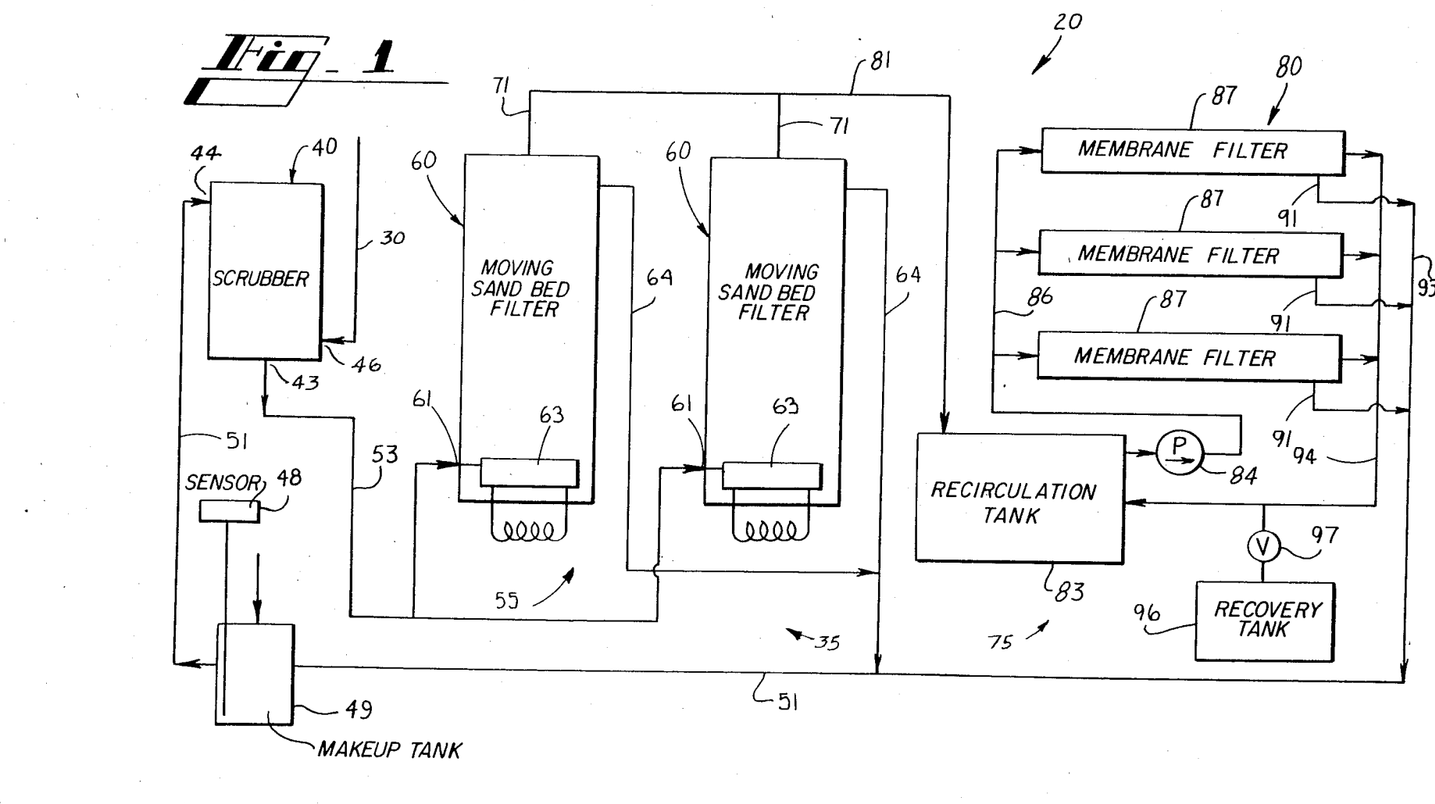
FIG. 1 is a schematic view of an apparatus of this invention for recovering germanium from the effluent of a process which is used to manufacture optical preforms.

Referring now to FIG. 1, there is shown a schematic of apparatus designated 20 for recovering germanium from the effluents of an optical fiber manufacturing process such as MCVD that is accomplished in the substantial absence of hydrogen such as the hydrogen in water. The apparatus 20 is commonly referred to as a loop. The MCVD process is fully described in U.S. Pat. No. 4,217,027 which issued on Aug. 12, 1980. The effectiveness of this technique relies on the efficient removal of germanium from the effluent gases. The inventive process also relies on the realization that a relatively large portion of the germanium exiting the MCVD manufacturing process is in vapor rather than in particulate form. The methods and apparatus of this invention are capable of being used to recover a valuable raw material which is used relatively inefficiently in a process.

Figures 2, 3:
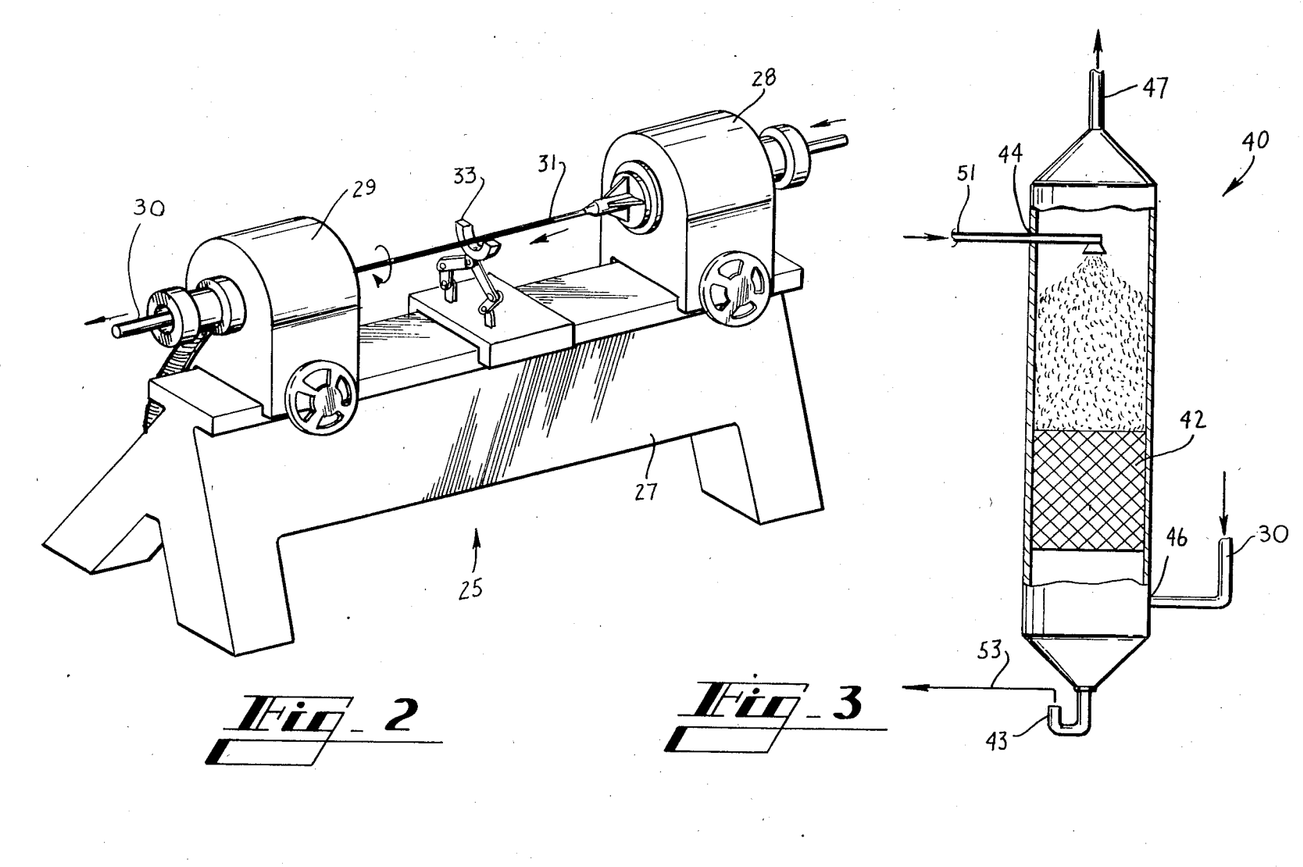
FIG. 2 is a perspective view of apparatus which is used to manufacture optical preforms.
FIG. 3 is an elevational view of a system which is used to scrub effluents from the apparatus of FIG. 2.

In FIG. 2 there is shown an apparatus 25 for manufacturing an optical preform from which lightguide fiber is drawn. The apparatus comprises a lathe 27 which includes a headstock 28 and a tailstock 29. A substrate tube 31 is supported rotatably between the headstock and the tailstock. Chemcial materials for reaction and deposition are moved into the substrate tube from the headstock end and effluents exhausted through a line 30 from the tailstock end. The reaction and deposition occur as the substrate tube 31 is traversed by a moving hot zone provided by a torch assembly 33. See U.S. Pat. No. 4,231,777 which issued Nov. 4, 1980 in the names of B. Lynch and F. P. Partus.

Effluent which comprises germanium in both vapor and solid form is treated in accordance with the methods of this invention to recover germanium therefrom. The effluent from the lathe 27 comprises silicon dioxide ($SiO_2$), germanium dioxide ($GeO_2$), phosphorous pentoxide ($P_2O_5$), germanium tetrachloride ($GeCl_4$) and chlorine gas ($Cl_2$). The first three constituents comprise about 10% by volume and less than 3% by weight whereas the germanium tetrachloride comprises about 70% by volume and its hydrolysis product, sodium germanate ($Na_2GeO_3$), has a relatively high solubility.

In the MCVD process, effluent from the lathe 27 is directed to a primary portion 35 of the recirculation loop 20 which includes a scrubber designated generally by the numeral 40 (see FIGS. 1 and 3). The scrubber 40 which is used to react chemically gases with a liquid is columnar and includes a packing 42 intermediate an outflow opening 43 and an inlet 44. The packing 42 comprises chemically inert packing particles which are selected for size and shape to provide maximum contact surface between a liquid scrubbing medium and the gaseous effluent. The liquid medium which is flowed into the inlet 44 is an aqueous medium which is a solvent for the reaction product of germanium tetrachloride. In a preferred embodiment, the aqueous medium comprises sodium hydroxide. From the lathe 27, effluents are flowed along the line 30 into the scrubber 40 through an inlet 46 and upwardly to meet jet streams of the liquid medium moving downwardly from the inlet 44. The packing 42 is used to improve the residence time within the scrubber 40 and to increase the contact area. The greater the contact area, the greater is the scrubbing action. Gases which have been scrubbed vent along a line 47 to a stack (not shown) which leads to a roof scrubber that scrubs the output from the lathe scrubber 40.

The liquid medium which is flowed into the inlet 44 comprises the solvent and a substantially clear recirculating filtrate from the loop 20 of this invention. That liquid medium has at least a predetermined pH value. A pH sensor 48 (see FIG. 1) is positioned in a makeup tank 49 in a line 51 through which the filtrate flows into the scrubber. If the sodium hydroxide, for example, has been spent and the pH is lower than desired, additional base material is added to maintain the pH value.

The process effluent which is contacted with the aqueous medium may vary. It could comprise a gas and particulates which when contacted provide a solvent solution and particulates which do not dissolve, at least during the time in the scrubber. Or, it could comprise a gas which when treated with the liquid medium provides a solvent solution and particulates, or a gas which when treated goes entirely into solution. The effluent is contacted with an aqueous medium to dissolve at least a portion of the material to be recovered. The germanium tetrachloride reacts instantly whereas the germanium particulates require much more time to be dissolved.

The scrubber provides a recirculating mixture which comprises a liquid medium and particulate matter. The term "mixture" is intended to mean a dispersion of solids in the solution formed by the gaseous effluent and the liquid medium. The liquid medium may be a solvent or a non-solvent liquid medium. Either there are particulates in the effluent from the lathe 27 or particulates obtained as a result of the scrubbing. Of course, should there be no particulates, the liquid medium is withdrawn and the sought-after constituent precipitated out of solution. In the preferred embodiment, the output of the scrubber is a recirculating solvent mixture which includes particulates and a solvent solution including the constituent to be recovered.

From the scrubber outlet 43 to the filter portion of the loop 20 is flowed the recirculating mixture which comprises the reaction products of germanium tetrachloride, which include sodium germanate, the aqueous medium solvent and particulates comprising $SiO_2$, $GeO_2$, $P_2O_5$ and dissolved sodium hypochlorite. The particulates comprise about 10% by volume and less than 3% by weight. The solubility of the sodium germanate is relatively high but that of the particulates is not, and hours of residence time would be required to dissolve them. Inasmuch as this time is not available, other arrangements of handling the particulates must be made within the loop.

The recirculating mixture from the scrubber 40 is directed along a line 53 to a first filter system 55 (see FIG. 1). The filter system 55 together with the scrubber 40 comprises the primary portion 35 of the loop 20. The filter system 55 includes a pair of moving sand bed filters each of which is designated generally by the numeral 60. In a preferred embodiment of this invention, the sand bed filter 60 is one which is available from the Parkson Corporation of Fort Lauderdale, Fla.

Figure 4:
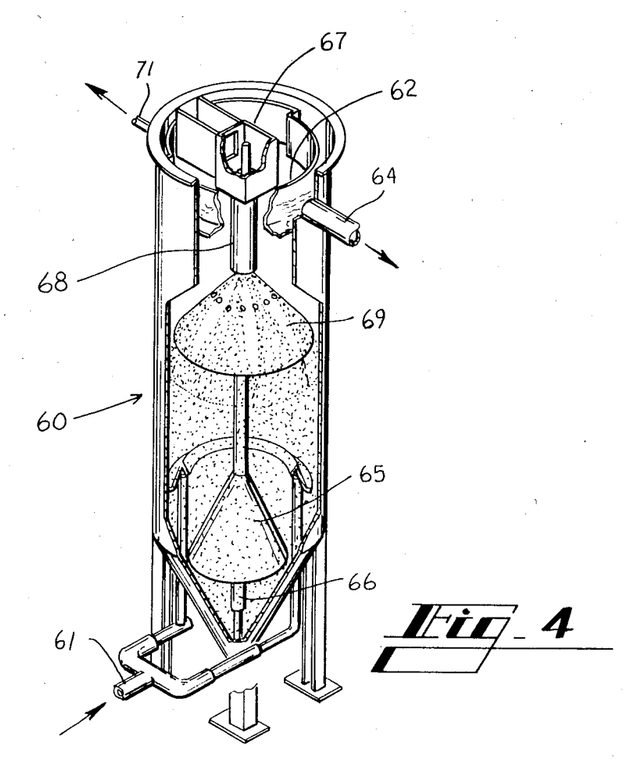
FIG. 4 is a perspective view of a filter system of the apparatus of FIG. 1.

In each sand bed filter 60, the recirculating mixture enters a bottom inlet 61 (see FIGS. 1 and 4) and moves upwardly. In order to maintain a suitable temperature, a heater 63 is mounted in each filter 60. The recirculating mixture moves upwardly through a bed of sand which moves downwardly, trapping particulates above a first predetermined size which in the preferred embodiment is 10 microns ($\mu$m). The filtered portion of the mixture, which is referred to as a filtrate, overflows a weir 62 and is flowed through an outlet along a line 64. The filtrate which becomes a recirculated portion of the mixture comprises particulate matter that generally does not exceed the first size. The lines 64—64 from the filters 60—60 are connected to the line 51 which supplies the filtrate from the first filter system to the tank 49. The sand carries the filtered particulates to a cone 65 at the bottom of the filter. From there, the sand, particulates and a portion of the liquid medium are moved upwardly through a vertically disposed tube 66 under the influence of compressed air. A turbulent flow of air, liquid medium and sand separates the particulates as they approach a top portion 67. Sand overflows the top, is washed and falls through a washer 68 where the sand is further cleansed. The cleansed sand is returned to the top of the sand bed by a cone shaped distributor 69. The portion of the recirculating mixture which includes particulates larger than the first predetermined size and which is rejected by the filter system and referred to as a residue is moved through an outlet 71. It should be understood that the term "residue" is intended to refer to material which is not passed by the filter and that it includes particulates smaller than the first predetermined size and a portion of the liquid medium as well as the particulates larger than the first predetermined size.

Figures 5, 6:
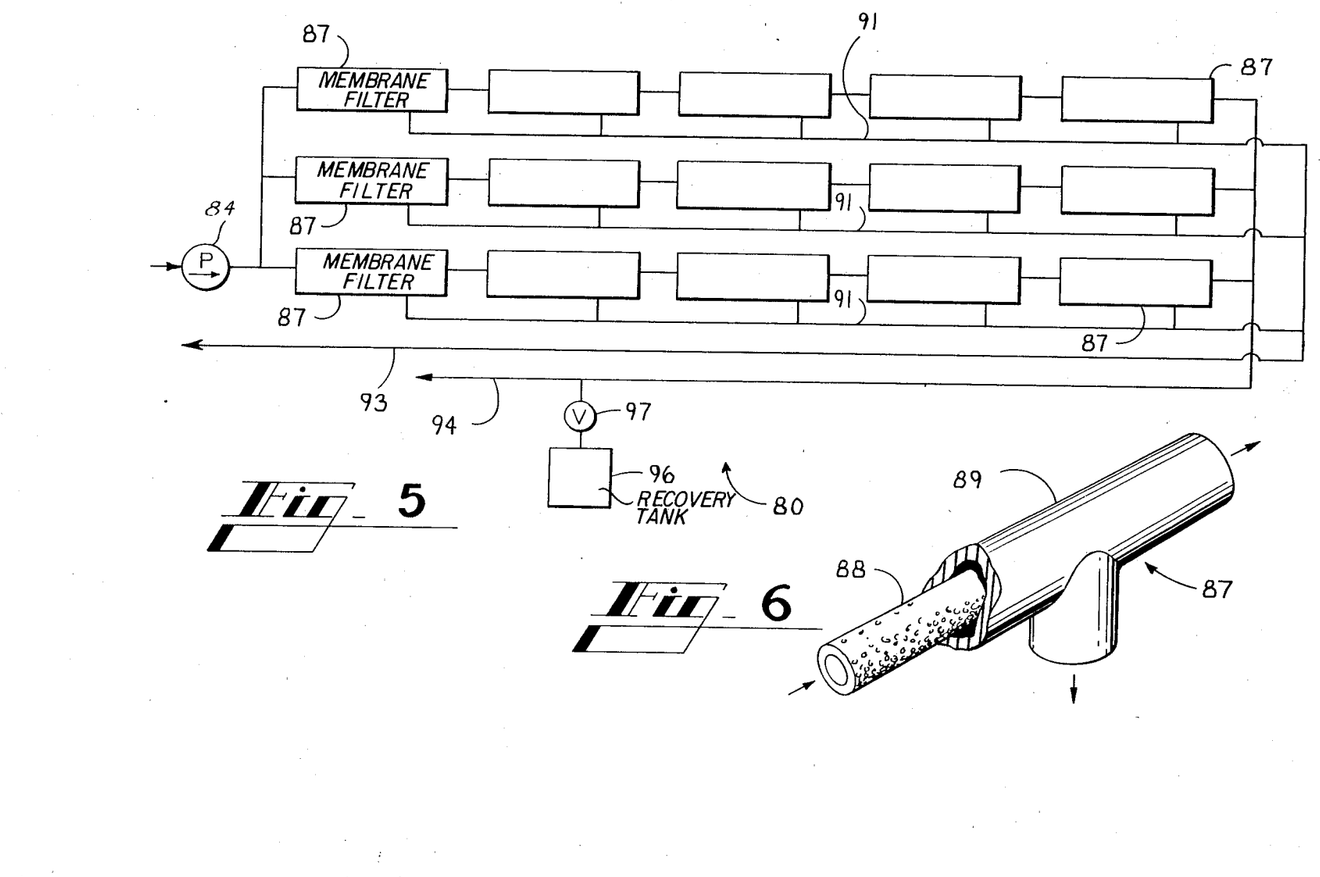
FIG. 5 is a schematic view of another filter system of the apparatus of FIG. 1.
FIG. 6 is a perspective view of a filter of the system shown in FIG. 5 with a portion thereof broken away for purposes of clarity.

From each first filter 60, the residue including particulate matter greater than the first size is moved to a secondary portion 75 of the loop 20 which includes a second filter system, designated generally by the numeral 80 (see FIGS. 1 and 5). The residue from the first filter system 55 is flowed along a line 81 to a recirculation tank 83. From the tank 83, the residue material which comprises particulate matter above the 10 micron size is moved by a pump 84 along a line 86 to each of a plurality of membrane filters 87—87. Such a filter is available commercially from Memtek Corporation of Woburn, Mass. under the designation DYNA-SEP ® system.

Particulate matter not exceeding a second size, which in a preferred embodiment is 0.1 micron, and a portion of the aqueous medium are caused to flow through walls of tubular members 88—88 (see FIG. 6) which are made of a porous membrane material and which are disposed in housings 89—89. Particles of a size which does not exceed 0.1 $\mu$m do not affect the nozzles in the scrubber 40 and are not large enough to coagulate at a rate so as either to deposit on the inside walls of the piping or choke the sand-beds in the first filter system. The portion of the recirculating mixture passed through the membrane walls, which is referred to as filtrate, drains by gravity into the associated housings 89—89 and is collected therefrom along lines 91—91 for movement along a line 93 to the line 51 and scrubber 40. As mentioned hereinbefore, the filtrates are tested for pH value by the sensor 48 and adjusted if necessary by the addition of a base material such as sodium hydroxide.

Particulates above the second size of 0.1 micron are unable to pass through the membrane material of each filter 87 and are moved along through the tubular member and out of the housing. This portion of the recirculating mixture, together with particulates smaller than the second size and a portion of the liquid medium, also is referred to as a rejected portion or residue and is returned to the tank 83 along line 94 for recirculation through the membrane filters 87—87. As the level in the recirculating tank 83 increases, the system is caused to activate additional ones of the membrane filters 87—87 to provide more surface area in accordance with demand.

A withdrawal may be made from the loop 20, which comprises the scrubber 40, the first and second filter systems 55 and 80 and the recirculating tank 83 in the membrane filter system, depending on the amount of germanium in the loop. On predetermined occasions, portions of the residue recirculating through the membrane filters 87—87 are directed into a recovery tank 96 by opening a valve 97. Should the valve 97 be closed, the residue from inside the tubular membrane filters 87—87 is returned to the tank 83 and recirculated through the second filter system 80. Although the concentration of the loop input varies as a function of the product, for example, that of the recovered output is substantially constant. The withdrawn material in the tank 96 has the same concentration level as the remainder of the loop 20 and includes particulates in which there is some germanium. The bulk of the germanium is in the recirculating liquid medium because its reaction products are dissolved therein.

The withdrawn portion comprises various sodium salts, and a sodium germanium complex all of which are soluble, as well as solids of $SiO_2$, and $GeO_2$. The materials in the tank 96 are held for subsequent germanium recovery in accordance with the methods of U.S. Pat. No. 4,385,915. A precipitating agent for the withdrawn residue in the tank 96 precipitates the germanium from the particulates as well as from the solvent solution. The withdrawn portion is treated with a precipitating agent such as magnesium to provide a precipitate cake comprising magnesium germanium, magnesium silicon and magnesium hydroxide solids. The cake composition comprises about 1 to 3% wet weight of germanium and about 9% silicon and magnesium compositions. At a concentration level of 600 ppm, the precipitation process results in a wet weight of about 1-3% of germanium which is equivalent to a dried weight of about 5-13%. The recovered filter cake is dissolved in hydrochloric acid to recover germanium tetrachloride in liquid form. It will be recalled that the efficiency of the recovery process for germanium is a function of its concentration. For example, if the wet weight of germanium is less than 1%, the subsequent recovery of germanium tetrachloride from the filter cake is about 80-85%, whereas for a concentration level of .4%, the recovery rate increases to about 95% and the expense decreases.

In the preferred embodiment, the first filter system 55 is effective to control the amount of particulates in the recirculating mixture whereas the second filter system 80 is effective to control the concentration of the germanium. Should it be desired to increase the germanium concentration such as during start-up of the recovery operation or during maintenance jobs, the amount withdrawn from the second filter system 80 is reduced. It can be reduced to zero so that no germanium leaves the loop. On the other hand, should it be desired to reduce the concentration of germanium in the recirculating mixture, the amount withdrawn from the second filter system 80 is increased. Accordingly, should the germanium concentration be low, the valve 97 is closed. After the concentration goes high, the valve 97 is opened to withdraw portions of the mixture which is being recirculated within the secondary portion 75 of the loop 20 until the concentration of the germanium in the loop drops. Of course, if the input to the loop is substantially constant, the valve 97 can be controlled to open in accordance with a predetermined schedule. The apparatus 20 is designed so that a residue is always outflowed from each first filter 60. However, the withdrawn portion of the recirculating residue from the second filter system 80 could be reduced to zero in order to increase the concentration of the germanium.

It is desirable to maintain the particulates at a minimum level. If too high, particulates may become deposited in piping which interconnects portions of the loop 20. Also, nozzles in the scrubber 40 have relatively small orifices which would clog. Lastly, the particulate matter would coagulate and cause clogging of the sand filter resulting in a shutdown of the operation. The level of particulates increases, for example, when the pH of the recirculating mixture decreases. If the level of particulates becomes too high, the residue from the sand filters 60—60 is increased and additional membrane filters 87—87 are activated to return more of the recirculating mixture. A particle size less than 0.1 micron is harmless insofar as the system is concerned. Advantageously, the residue from the first filter can be as high as about 20%.

EXAMPLE 1

For a bank of scrubbers which produced a total of 100 gallons per minute (gpm) of process effluent, the effluent was split equally and introduced at the bottom of two sand-bed filters which were adapted to work in parallel with a particulate loading of 1000 ppm having a distribution of 800 ppm with a size greater than 10 microns and 200 ppm with a size which does not exceed 10 $\mu$m. The sand bed filters 60—60 were set at a residue rate of 20%. Because each sand-bed filter 60 could effectively filter particulates greater than 10 $\mu$m in size, the filtrate of 80 gpm from the first filter system 55 essentially was free of particulates above this size. The portion of the recirculating mixture which was rejected as residue from the sand-bed filter system was at 10 gpm per filter unit. It included the particulates over the 10 $\mu$m size, as well as particulates over the 0.1 $\mu$m size, and was flowed to a set of the membrane filters 87—87.

At any time, depending on the membrane area which has been activated, the secondary portion 75 of the loop 20 recirculated through the tank 83 a number of gallons of flow of the mixture which included the residue from the second filter system 80 as well as an input from the first filter system 55. The membrane filter system 80 was automated such that an increment of rejected effluent at the rate of 20 gpm from the sand filters 60—60 could be filtered to provide a filtrate of 20 gpm and a withdrawal rate of 0 gpm, or the effluent withdrawn into the tank 96 could be set to a predetermined flow, which normally ranged from 0.5 gpm-5 gpm maximum. During normal operation, the filtrates from both the sand-bed and the membrane filter systems were returned to the MCVD scrubbing system for reuse to trap additional germanium over successive recycling steps.

When a desired concentration, for example at least 600 ppm, had to be maintained in the recirculation loop, the withdrawal from the membrane filter system was controlled based on the germanium input to the system. For example, at one point, the germanium input to the system was at the rate of 6 ppm at the scrubbers. The withdrawal rate from the loop 20 was determined from a mass balance equation in which the product of germanium input in ppm/gpm and total flow in gpm is equal to the product of germanium output in ppm/gpm and the withdrawal rate in gpm. The withdrawal rate can be determined, because the germanium output is determined by the equilibrium concentration of the loop. If, for example, there was a need to maintain 600 ppm as the equilibrium loop concentration, then, from the previous massbalance equation, the withdrawal rate was set at 1 gpm. This did not affect the recirculation loop, since the membrane system can filter particulates which exceed the 0.1 $\mu$m size even with a withdrawal rate of 0 gpm. It should be clear that during normal operation, the hereinbefore-described combination of filter systems can be adjusted to maintain the required germanium concentration in the loop 20, regardless of the fluctuations in the germanium inpu tand to adjust the withdrawal rate accordingly.

EXAMPLE 2

The apparatus 20 also was effective to adjust for a non-equilibrium condition which results in either a relatively low germanium concentration or a relatively high particulate level to bring the loop back to normal operation. Two situations were encountered.

(1) During start-up of the operation, a relatively low germanium loop concentration of 100 ppm, for example was experienced. Since the desired equilibrium concentration of the loop was 600 ppm, the withdrawal rate from the membrane system was set at 0 gpm. By controlling the height of the weirs at the outlets of the sand filters 60—60, the residue from the first filter system 55 was increased. The sand filters 60—60 passed 30 gpm as residue to the membrane filter 80. As a result, the residue obtained from the second filter system 80 was increased. The second filter system 80 was automated so that as it received more residue from the first filter system 55 more surface area was activated. The membrane filter system 80 was set to provide no withdrawal and passed 30 gpm of filtrate back to the scrubber 40. By increasing the amount of the residue from the first filter system, more particulates were removed from the recirculating mixture. Although no germanium was withdrawn from the loop, it was added continuously thereto. This resulted in a rapid build-up of the germanium concentration. Eventually, the recirculating mixture reached a desired germanium concentration level and then withdrawal from the filter systems was adjusted to maintain a desired particulate level and germanium concentration. Once the required concentration of 600 ppm was achieved, the withdrawal rate was set to balance the input, thus maintaining the loop concentration with a set withdrawal rate. Advantageously, the loop 20 was operable during these adjustments, thus avoiding any down time. The particulates concentration was not a problem because the membrane system 80 filtered all the particulates above the 0.1 $\mu$m size.

(2) A reduction in pH from 12 to 11.5 was caused by the failure of the pH sensor 48. The particulate level increased substantially, by a factor greater than 10, and resulted in the precipitation of relatively large quantities of the dissolved material. The accompanying sudden increase in suspended solids could have resulted in a clogging of the sand-bed filters 60—60 and the scrubber. A withdrawal flow of 3 gallons per minute had been required to obtain and maintain a germanium concentration level of 600 ppm for an input of 300 gpm and concentration of 6 ppm. With a drop in pH and the accompanying increase in particulates, it became necessary to increase the residue from the first filter system by a factor of about 10 for each sand bed filter 60 to work properly. It became necessary to increase the residue from each sand-bed filter from 3 gpm to 30 gpm in order to avoid the clogging and also to puge a majority of the suspended solids. This condition if not corrected could have reduced the germanium concentration to about one-tenth of what it was before the system malfunction. The residues with the excess solids were flowed to the membrane system 80, which filtered out the particulates above the 0.1 $\mu$m size. As the solids in the membrane filter system increased, the level in the recirculating tank 83 increased, due to the temporary reduced filtration rate in terms of gpm/ft$^2$ of membrane surface. For example, a 40 gpm input to the recirculation tank 83 with a reduction of the filtrate rate from 37 gpm to 17 gpm, for example, resulted in an additional accumulation of 23 gpm in the recirculation tank. The level rose, and sensors activated additional membrane surface area for filtration. Thus even though the filtration rate dropped due to increased solids, the system called for additional membrane surface area and thus maintained the required filtration rate. Continued operation under these conditions removed the excess particles from the loop 20 without affecting the recirculation process. Concurrently, the malfunctioning pH sensor was repaired. The pH of the recirculating mixture increased which eliminated the formation of an excess amount of particulates. Once the solids were down to acceptable levels, the system parameters were reset to normal operation. Advantageously, with the instant system, the germanium concentration was held in balance because of the cooperation of the second filter system 80 with the first filter system 55. Although the rejected residue from each of the two sand bed filters 60—60 was increased from 3 to 30 gpm, for example, the membrane system 80 adjusted to pass 57 gpm as filtrate and 3 gpm as residue to maintain a desired germanium concentration level, in spite of the increased particulates.

It is to be understood that the above-described arrangements are simply illustrative of the invention. Other arrangements may be devised by those skilled in the art which will embody the principles of the invention and fall within the spirit and scope thereof.

What is claimed is:

1. A method of recovering a constituent of a process effluent such that the concentration of the constituent is at least a predetermined value, said method including the steps of:

contacting the process effluent with a liquid medium to provide a recirculating mixture which includes the liquid medium and particulates with at least the particulates including the constituent to be recovered;

flowing the mixture into a first filter to provide a filtrate and a residue;

flowing the residue from the first filter into a second filter to provide a filtrate and a residue which is recirculated through the second filter;

contacting subsequent process effluent with the filtrates; and withdrawing a portion of the residue from the second filter when the concentration of the constituent is at least the predetermined value.

2. The method of claim 1, wherein the liquid medium comprises an aqueous medium which is effective to dissolve at least a portion of the effluent and the mixture comprises particulates and a solvent solution of the constituent to be recovered.

3. The method of claim 1, wherein the filtrate from the first filter is substantially free of particulates larger than a first size and the filtrate from the second filter is free of particulates larger than a second size that is smaller than the first size, and wherein the filtrates and the subsequent process effluent which is contacted therewith are recirculated through the filters.

4. The method of claim 3, wherein the residue from the first filter includes particulates larger and smaller than the first size and a portion of the liquid medium, and the residue from the second filter includes particulates larger and smaller than the second size and a portion of the liquid medium.

5. A method of recovering germanium from the gaseous effluent of a lightguide fiber preform manufacturing process which involves the reaction of silicon and germanium compositions with oxygen in the substantial absence of a source of hydrogen, said method including the steps of:
  treating the process effluent with an aqueous medium to dissolve and react gaseous germanium entities from the effluent in the aqueous medium, and to provide a recirculating mixture which comprises particulates and a solvent solution comprising the aqueous medium and the reacted gaseous germanium entities;
  flowing the mixture into a first filter which provides a filtrate that is substantially free of particulates larger than a first size and a residue;
  flowing the residue from the first filter to a second filter which is effective to provide a filtate which is free of particulates larger than a second size that is smaller than the first size and a residue;
  recirculating the residue from the second filter through the second filter;
  contacting subsequent process effluent from the preform manufacturing process with the filtrates from the first and second filters; and
  withdrawing portions of the residue from the second filter when the germanium concentration of the mixture is at least a predetermined level.

6. The method of claim 5, wherein the filtrates and the subsequent process effluent which are contacted with the filtrates are recirculated through the first and second filters and wherein the residue from the first filter includes particulates larger and smaller than the first size and a portion of the aqueous medium, and wherein the residue from the second filter includes particulates larger and smaller than the second size and a portion of the aqueous medium.

7. The method of claim 5, wherein the step of flowing the residue from the first filter is capable of being adjusted to control the percent of particulates in the filtrates and wherein the step of withdrawing the residue from the second filter is capable of being adjusted to control the germanium concentration in the withdrawn portion of the residue from the second filter.

8. The method of claim 5, which also includes the step of treating the withdrawn portion of the residue from the second filter with a precipitating agent for the constituent to be recovered.

9. The method of claim 5, wherein the first filter is effective to remove particulates having a size which exceeds 10 microns and the second filter is effective to remove particulates having a size which exceeds 0.1 micron.

10. The method of claim 5, wherein the step of treating the effluent with an aqueous medium includes the steps of:
  moving a process effluent comprising gaseous germanium and particulates into a lower portion of a columnar chamber;
  causing the effluent to be moved upwardly; while causing jet streams of the aqueous medium having a predetermined pH value to be directed downwardly to react with the effluent and produce reaction products comprising a relatively clean gaseous material and a solvent mixture comprising particulates and a solvent solution which comprises a dissolved reaction product of germanium.

11. The method of claim 10, wherein the filtrates from the first and the second filters are directed into the columnar chamber to treat the upwardly moving effluent to produce the reaction products.

12. An apparatus for recovering a material from a process effluent such that a constituent of the material has at least a predetermined concentration, said apparatus comprising:
  treating means for contacting the effluent with a liquid medium to provide a recirculating mixture which includes the liquid medium and particulates with at least the particulates including the constituent to be recovered;
  first filter means connected to said treating means for removing from the mixture particulates above a first size to provide a filtrate which is substantially free of particulates larger than the first size and a residue;
  second filter means connected to said first filter means for removing from the residue from said first filter means particulates above a second size that is smaller than the first size to provide a filtrate which is free of particulates larger than the second size and a residue which is recirculated through said second filter means;
  means for directing the filtrates from said first and second filter means to said treating means to contact process effluent which is flowed into said treating means; and
  means rendered effective when the concentration of the constituent to be recovered is at a predetermined level for withdrawing a portion of the residue from said second filter means.

13. The apparatus of claim 12, wherein the filtrates and the process effluent contacted therewith are recirculated through said first and second filter means.

14. An apparatus for recovering germanium from the gaseous effluent of a lightguide fiber preform manufacturing process which involves the reaction of silicon and germanium compositions with oxygen in the substantial absence of a source of hydrogen, said apparatus including:
  scrubbing means for subjecting the effluent to an aqueous medium to dissolve gaseous germanium entities from the effluent in the aqueous medium, and to provide a recirculating mixture comprising particulates and a solvent solution comprising the dissolved, reacted gaseous germanium entities;
  first filter means connected to said scrubbing means for removing particulates larger than a first size from the recirculating mixture to provide a filtrate which is substantially free of particulates larger than the first size and a residue;

second filter means connected to said first filter means for removing particulates larger than a second size that is smaller than the first size from the residue from said first filter means to provide a filtrate which is free of particulates larger than the second size and a residue;

recirculating means for causing the residue from said second filter means to be reflowed therethrough;

means for moving the filtrates to said scrubbing means to contact subsequent process effluent; and means rendered effective when the concentration of the germanium is at a predetermined level for withdrawing a portion of the residue from said second filter means.

15. The apparatus of claim 14, wherein the filtrates and the subsequent effluent contacted therewith are recirculated through said first and second filter means, wherein the residue from said first filter means includes particulates smaller and larger than the first size and a portion of the aqueous medium, and wherein the residue from said second filter means includes particulates larger and smaller than the second size and a portion of the aqueous medium.

16. The apparatus of claim 14, wherein said second filter means includes a membrane filter and said recirculating means includes a holding tank for receiving the residue from said second filter means and the residue from said first filter means, said means for withdrawing a portion of the residue from said second filter means being interposed between said membrane filter and said holding tank.

17. The apparatus of claim 14, wherein the first size is 10 microns and wherein the second size is 0.1 micron.

18. The apparatus of claim 14, wherein said apparatus also includes means for sensing the pH of the solvent solution of the mixture which is flowed into said scrubbing means and for maintaining the pH at a predetermined value.

19. The apparatus of claim 14, which also includes regulating means for adjusting the residues from said first and second filter means, and wherein said regulating means for said second filter means may be adjusted to prevent the withdrawal of residue therefrom.

* * * * *